United States Patent
Qanaei

(10) Patent No.: US 8,719,989 B1
(45) Date of Patent: May 13, 2014

(54) CHEMICAL PIGGING APPARATUS FOR PIPELINES

(71) Applicant: Ahmd Abdallah Al-Jassem Qanaei, Salwa (KW)

(72) Inventor: Ahmd Abdallah Al-Jassem Qanaei, Salwa (KW)

(*) Notice: Subject to any disclaimer, the term of this patent is extended or adjusted under 35 U.S.C. 154(b) by 0 days.

(21) Appl. No.: 14/062,834

(22) Filed: Oct. 24, 2013

(51) Int. Cl.
*B08B 9/04* (2006.01)

(52) U.S. Cl.
USPC ............... 15/104.061; 15/104.05; 15/104.062

(58) Field of Classification Search
USPC .................. 15/104.05, 104.062, 104.061, 3.5
See application file for complete search history.

(56) References Cited

U.S. PATENT DOCUMENTS

| | | | |
|---|---|---|---|
| 3,643,280 A | | 2/1972 | Powers |
| 4,558,751 A | * | 12/1985 | Huffaker ........................ 175/99 |
| 5,113,885 A | | 5/1992 | Ramsey |
| 5,795,402 A | | 8/1998 | Hargett, Sr. et al. |
| 6,527,869 B1 | | 3/2003 | Bourg |
| 7,005,012 B2 | | 2/2006 | Bourrelly et al. |
| 7,354,483 B2 | | 4/2008 | Farris |
| 7,827,646 B2 | | 11/2010 | Pruett |
| 2010/0000037 A1 | * | 1/2010 | Pruett et al. .............. 15/104.061 |

FOREIGN PATENT DOCUMENTS

DE      198 55 175      6/2000

* cited by examiner

*Primary Examiner* — Shay Karls
(74) *Attorney, Agent, or Firm* — Richard C Litman

(57) ABSTRACT

The chemical pigging apparatus for pipelines includes a forward component and a rearward component. The forward component has front and rear seals, with a chemical chamber between. A flexible elongate dispensing tube is in communication with the front of the chamber, with the tube having a perforated dispensing tip at its forward end. The chamber is open to the rear, with a piston sealing the rear portion of the chamber. The rearward component has a rearward component seal, with a rod extending forward of the seal. The rod has a protrusion that seats within a mating socket at the rear of the piston. The apparatus is propelled through a pipeline by pressure behind the rearward component seal, with the rearward component pushing the forward component through the pipeline and pushing the piston into the chemical chamber to expel chemicals through the forward dispensing tube and its dispensing tip.

20 Claims, 3 Drawing Sheets

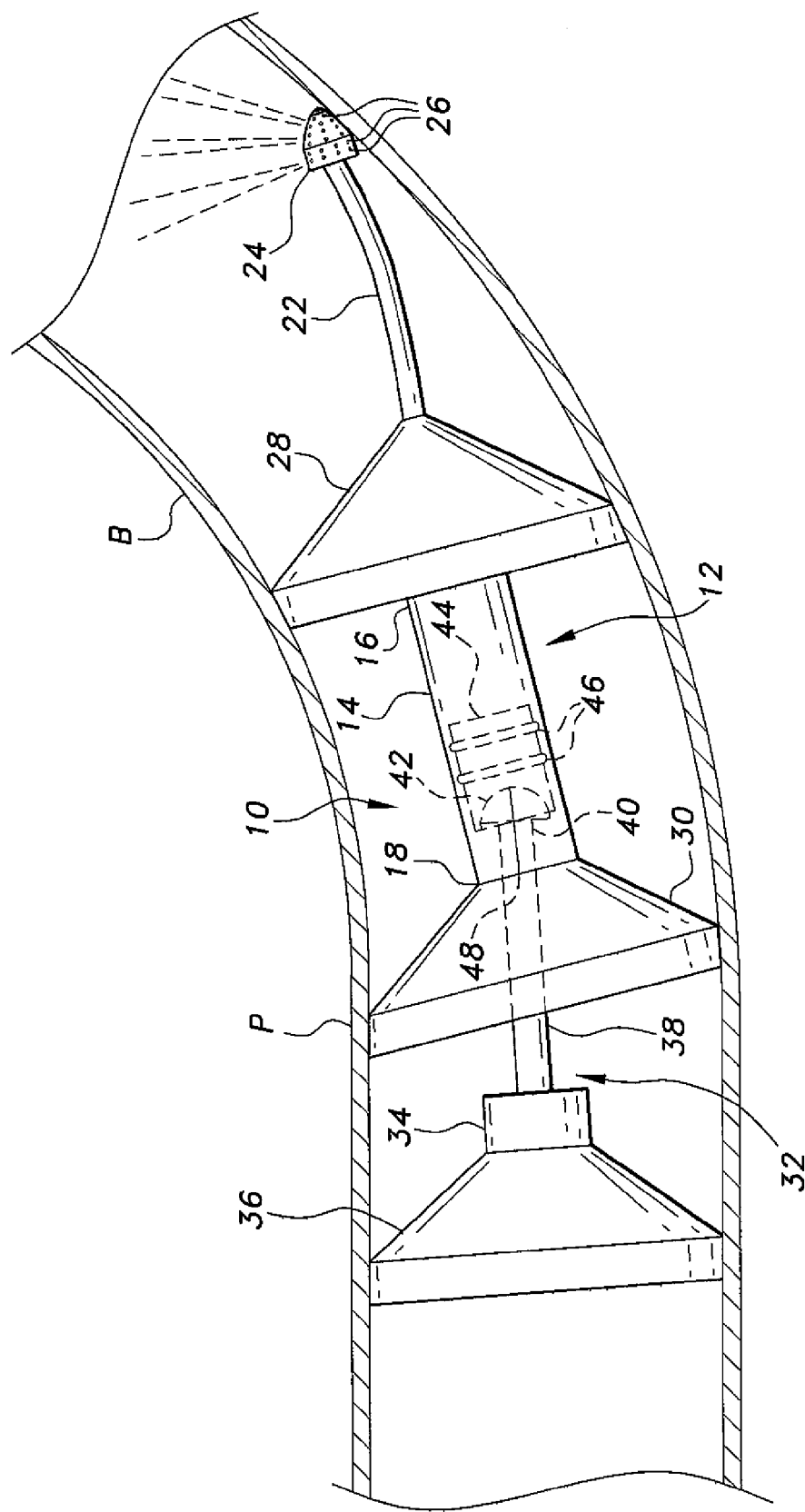

US 8,719,989 B1

CHEMICAL PIGGING APPARATUS FOR PIPELINES

BACKGROUND OF THE INVENTION

1. Field of the Invention

The present invention relates generally to tools and devices for cleaning and maintaining equipment and particularly to a chemical pigging apparatus for pipelines, more particularly for gas and oil pipelines.

2. Description of the Related Art

Practically all fluids, e.g., gas and oil, include various contaminants and materials that eventually fall out of solution or react with other materials. This is a particular problem in oil and gas pipelines and related conduits, as the contaminants and solids primarily include paraffins and asphalts that tend to build up along the inner walls of the pipes. If this condition is left to continue for a sufficiently long time, the buildup of contaminants can reach such a thickness that the inner diameter of the pipe becomes significantly restricted, thus reducing fluid flow and efficiency accordingly. Moreover, such buildups almost always result in uneven buildup within the pipes, thus creating turbulence and hydrodynamic or aerodynamic drag or resistance to the flow through the pipes.

Accordingly, various means have been developed in the past for cleaning such residue and deposits from the interior wall surfaces of pipes. Many, if not most, of these systems include remotely controlled or automated "pigs," i.e., devices that conform to the interior of the pipe and travel through the pipe to accomplish their intended purpose automatically. These pipeline pigs that are adapted or configured for cleaning out the pipes generally use some form of physical action to remove the buildup within the pipes, such as mechanical scrapers or high pressure blasting with liquids and/or particulates. Those devices that use chemicals generally require some form of relatively complex system to dispense or release the chemicals from the pig.

An example of a pipeline cleanout pig is found in German Patent Publication No. 198 55 175 published on Jun. 15, 2000 to Fraunhofer Ges Forschung. This reference describes a pipeline pig having a pair of articulating arms extending from the flat front face thereof, with a third arm including a water discharge nozzle. The two arms articulate to guide and aim the nozzle as required to blast residue hydraulically from the internal pipe wall.

Thus, a chemical pigging apparatus for pipelines addressing the aforementioned problems is desired.

SUMMARY OF THE INVENTION

Embodiments of a chemical pigging apparatus for pipelines include two major components that are removably connected to one another. The first or forward component includes a chemical chamber with a conical seal at each end thereof. The rear of the chemical chamber is open, but a sealed piston is movably installed therein. The forward end of the chemical chamber, the chemical chamber walls, and the movable piston define therein a variable chamber volume. A flexible elongate dispensing tube extends from a chemical dispensing passage in communication with the forward end of the chemical chamber. The forward end of the flexible elongate dispensing tube includes a dispensing tip thereon, with the dispensing tip being perforated having therein a plurality of spray orifices.

The second or rearward component includes a rearwardly disposed seal, with a rod extending forwardly therefrom. The forward end of the rod has a protrusion extending therefrom, with the protrusion fitting into a mating socket in the piston of the forward component. The chemical pigging apparatus assembly is propelled through the pipeline by differential pressure, i.e., greater pressure behind the rearward component that pushes the seal of the rearward component, and thus the entire assembly, through the pipeline. The force upon the rear component pushes its protrusion against the socket in the back of the piston within the chemical chamber of the forward component, thus pushing the forward component through the pipe, as well. The force against the rear of the piston also results in the piston being pushed forwardly into the chemical chamber, and the forward movement of the piston enables the chemical(s) within the chemical chamber to be expelled through the forwardly extending tube and its perforated dispensing tip, thus distributing or dispensing the chemical(s) within the pipe.

These and other features of the present invention will become readily apparent upon further review of the following specification and drawings.

BRIEF DESCRIPTION OF THE DRAWINGS

FIG. 3 is an environmental side elevation view showing an embodiment of the chemical pigging apparatus for pipelines of FIG. 1 installed within a curved section of pipeline, illustrating an articulation of the apparatus.

Unless otherwise indicated, similar reference characters denote corresponding features consistently throughout the attached drawings.

DETAILED DESCRIPTION OF THE PREFERRED EMBODIMENTS

Embodiments of a chemical pigging apparatus for pipelines include a component device, including a forward component and a rearward component, which is passively propelled through a pipeline by differential pressure in the pipeline. The propulsive force also provides the pressurizing force to dispel the chemical(s) from the forward end of the assembly. The chemical or chemicals can be conventional chemical(s), suitably selected for their ability to dissolve the particular deposits being treated within the pipeline.

Figure 1:
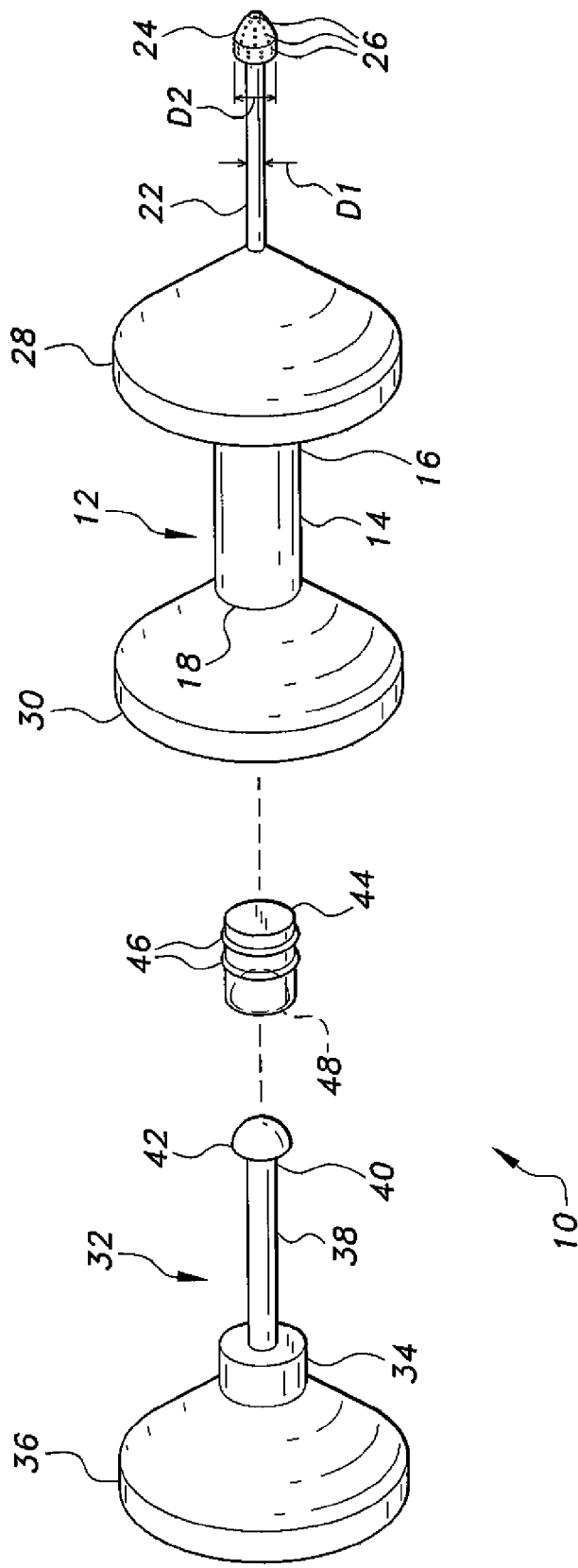
FIG. 1 is an exploded perspective view of an embodiment of a chemical pigging apparatus for pipelines according to the present invention, illustrating its various components.
Figure 2:
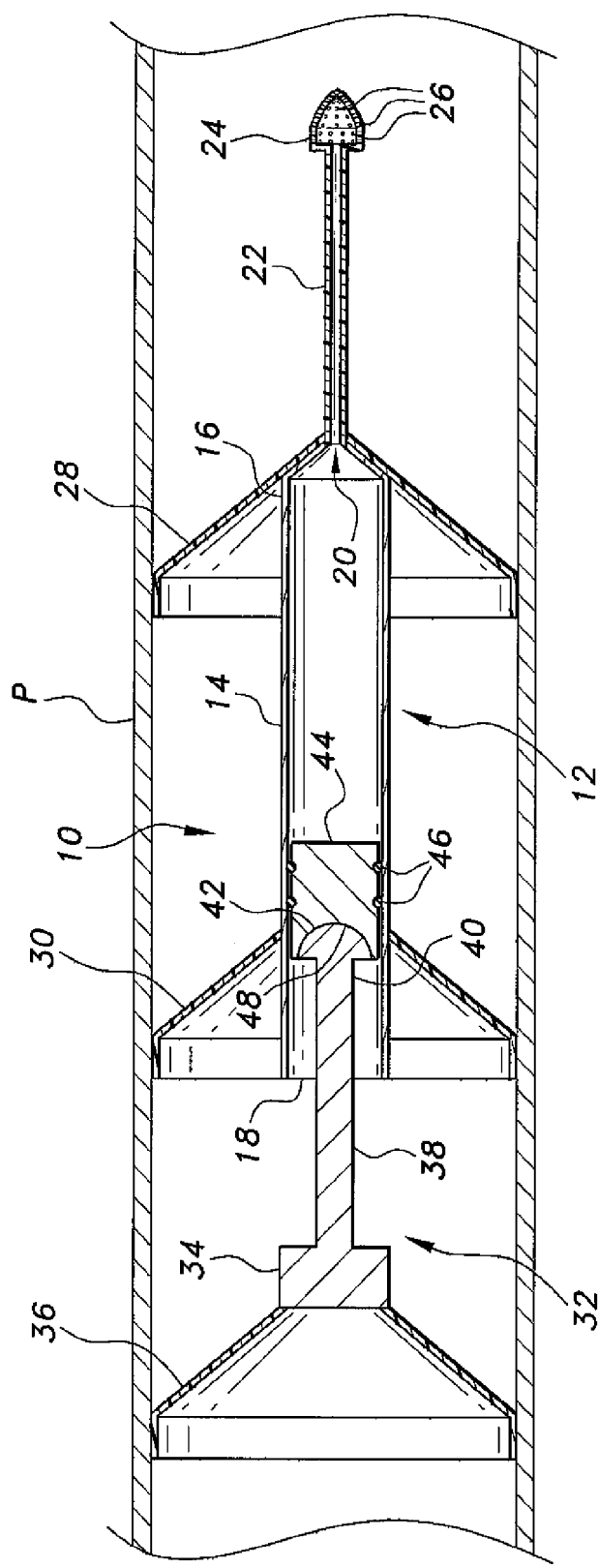
FIG. 2 is an environmental side elevation view in section showing an embodiment of the chemical pigging apparatus for pipelines of FIG. 1 installed within a straight section of pipeline.

FIG. 1 provides an exploded perspective view of the chemical pigging apparatus 10 illustrating its basic components, with FIGS. 2 and 3 illustrating the chemical pigging apparatus 10 as it negotiates two sections of pipeline. The first or forward component 12 of the chemical pigging apparatus 10 includes a hollow cylindrical chemical chamber 14 having a first or forward end 16 and a second or rearward end 18. The forward end 16 is in communication with a relatively narrow diameter chemical dispensing passage 20 (shown in the cross-section view of FIG. 2), while the rearward end 18 is open. An elongate, relatively narrow diameter chemical dispensing tube 22 extends forwardly from the chemical dispensing passage 20 in communication with the forward end 16 of the chemical chamber 14, with the forward end of the dispensing tube 22 having a perforated chemical dispensing tip 24 extending therefrom to dispense the chemical(s) moved from the chemical chamber 14 through the chemical dispensing passage 20 and the chemical dispensing tube 22. The dispensing tip 24 has a diameter D2 that is relatively larger than a diameter D1 of the dispensing tube 22. This provides the dispensing tube 22 with relatively greater flexibility for negotiating bends and curves in a pipeline P, while providing a relatively sufficient surface area for a reasonable number of perforations or orifices 26 in the dispensing tip 24.

A first or forward seal 28 is installed about the forward end 16 of the chemical chamber 14, with a similar second or rearward seal 30 installed about the rearward end 18 of the chemical chamber 14. These two seals 28 and 30 are of a suitable configuration, such as a generally conical configuration, with peripheral sealing edges or lips that are adapted to fit closely against the interior wall of the pipeline P, as shown in FIGS. 2 and 3. The two seals 28 and 30 can be formed of any suitable flexible material such as rubber, silicone, etc. having suitable chemically resistant properties to preclude damage from the chemicals carried in the chemical chamber 14 and dispensed by the chemical pigging apparatus 10.

The second or rearward component 32 includes a base 34 with a third seal 36 extending outwardly and rearwardly therefrom. The third or rearward component seal 36 is formed similarly to the two seals 28 and 30 of the forward component 12 and can be of a suitable configuration, such as a generally conical configuration. The third or rearward component seal 36 can also be formed of any suitable flexible material such as rubber, silicone, etc. having suitable chemically resistant properties to preclude damage from the chemicals carried in the chemical chamber 14 and dispensed by the chemical pigging apparatus 10.

A rod 38, such as a rigid rod, extends forwardly from the base 34. The rod 38 has a forward end 40 with a protrusion 42, such as a convex hemispherical protrusion, disposed thereon. The forward end 40 of the rod 38 and its protrusion 42 can be removably installed within the open rearward end or end portion 18 of the chemical chamber 14. A movable piston 44 is installed in the chemical chamber 14 in front of the protrusion 42 of the rod 38, with the piston 44 serving to seal the rearward end or end portion 18 of the chemical chamber 14 to contain the chemical(s) in the chemical chamber 14. The piston 44 can desirably be provided with a suitable sealing means or a suitable sealing device, such as a circumferential sealing means, e.g., O-rings 46, etc., to assist in containing the chemical(s) in the chemical chamber 14 until the chemical(s) are expelled or dispensed through the dispensing tip 24. The rearward end of the piston 44 has a socket 48, such as a concave hemispherical socket, formed therein, and the protrusion 42 of the forward end of the rod 38 is seated within and mates with the socket 48 of the piston 44.

FIG. 2 of the drawings illustrates the general operation of an embodiment of the chemical pigging apparatus 10. In FIG. 2, the chemical pigging apparatus 10 is passing through a straight section of the pipeline P. Travel or movement of the chemical pigging apparatus 10 through the pipeline P is typically passive, i.e., the chemical pigging apparatus 10 typically does not include a propulsion means or a propulsion device to independently move the chemical pigging apparatus 10 in the pipeline P, per se. Movement or travel of the chemical pigging apparatus 10 through the pipeline P is typically by a differential pressure in the pipeline P, with relatively higher pressure supplied behind the rearward component seal 36 of the rearward component 32 to move the chemical pigging apparatus 10 through the pipeline P. The cup-like conical seals 28 and 30, and particularly the third or rearward component seal 36, substantially prevent leakage of this pressure past the chemical pigging apparatus 10 and result in the chemical pigging apparatus 10 being pushed through the pipeline P, for example.

Also, as the differential pressure behind the third or rearward component seal 36 forces that third or rearward component seal 36 forward through the pipeline P, it forces the protrusion 42 into the socket 48 of the piston 44 installed in the chemical chamber 14 and can thereby enable a relative movement between the rearward component 32 and the forward component 12 of the chemical pigging apparatus 10. The piston 44 is thus pushed forward within the chamber 14 to pressurize the chamber 14 and force the chemical(s) therein to be expelled or dispensed out through the dispensing passage 20 at the forward end of the chamber 14, through the dispensing tube 22, and out through the orifices 26 of the dispensing tip 24.

The forward force or thrust produced by the rear component 32 pushing on the piston 44 also serves to propel the forward component 12 through the pipeline P. Control of the travel of the piston 44 through the chemical chamber 14, and thus the amount of chemical(s) being dispensed, can be achieved by a suitable flow controller or a suitable flow control means, such as a conventional valve (not shown), positioned at or in association with the dispensing passage 20 of the chemical chamber 14. The valve can be remotely operated, can be autonomous in operation, e.g., controlled by a timer, etc., or can be mechanically set, for example, to control the flow of the chemical(s) from the chemical chamber 14. Such valves are known in the art.

FIG. 3 of the drawings illustrates the chemical pigging apparatus 10 negotiating a bend B in the pipeline P. As the pipeline P curves through the bend B, the elongate dispensing tube 22 at the forward end of the chemical pigging apparatus 10 is no longer positioned substantially concentric within the pipeline P and is adapted to flex or bend as it passes through the bend B of the pipeline P, as illustrated in FIG. 3. If a bend, such as the bend B, is encountered in the pipeline P, the chemical dispensing tip 24 can contact the inner wall of the pipeline P. When the chemical dispensing tip 24 contacts the inner wall of the pipeline P, the flexible nature of the dispensing tube 22 can allow the dispensing tube 22 to bend or flex, resisting breaking of the dispensing tube 22. The resilient dispensing tube 22 can again straighten, once the bend B in the pipeline P has been negotiated.

While the three seals 28, 30, and 36, such as of a generally conical configuration, are relatively flexible, other of the components of the chemical pigging apparatus 10 can be substantially rigid, and the articulation of the forward component 12 and rearward component 32 relative to one another allow the forward component 12 and rearward component 32 to negotiate the bend B in the pipeline P substantially minimizing the occurrence of jamming or damage to the chemical pigging apparatus 10. The protrusion 42, such as a hemispherical protrusion, mating with and fitting into the socket 48, such as a corresponding hemispherical socket, of the piston 44 essentially can act as a ball joint to allow movement of the forward and rearward components 12 and 32 relative to one another, such as through three angular axes of freedom. Such relative movement of the forward and rearward components 12 and 32 can provide the chemical pigging apparatus 10 an ability to continue to travel through the pipeline P, such as assisted by an axial rotation of the forward and rearward components 12 and 32 relative to one another, with the ball joint type assembly of the protrusion 42 and the socket 48 assisting in allowing for angular displacement of the forward and rearward components 12 and 32 relative to one another, for example.

It is to be understood that the present invention is not limited to the embodiments described above, but encompasses any and all embodiments within the scope of the following claims.

I claim:

1. A chemical pigging apparatus for pipelines, comprising:
    a forward component, comprising:
        a chemical chamber having a forward end in communication with a chemical dispensing passage and having an open rearward end opposite the forward end;
        a forward seal disposed upon the forward end of the chemical chamber;
        a rearward seal disposed upon the rearward end of the chemical chamber; and
    a rearward component, comprising:
        a base;
        a rearward component seal disposed upon the base;
        a rod extending forwardly from the base, the rod having a forward end; and
        a protrusion disposed upon the forward end of the rod, the protrusion extending into the chemical chamber of the forward component,
        wherein the protrusion of the rod engages the forward component to move the forward component and to move a chemical from the chemical chamber into the chemical dispensing passage to dispense the chemical.

2. The chemical pigging apparatus for pipelines according to claim 1, wherein the protrusion pressurizes the chemical chamber of the forward component to dispense the chemical.

3. The chemical pigging apparatus for pipelines according to claim 1, further comprising:
    a piston sealingly and movably disposed within the chemical chamber, the piston having a rearward end,
    wherein the protrusion of the rod engages the rearward end of the piston and urges the piston forward within the chemical chamber to dispense the chemical by movement of the piston.

4. The chemical pigging apparatus for pipelines according to claim 3, wherein
    the piston includes a hemispherical socket disposed in the rearward end thereof,
    the protrusion of the rod includes a corresponding mating hemispherical configuration, and
    the protrusion of the rod articulatingly engages the socket of the piston to move the rearward component relative to the forward component.

5. The chemical pigging apparatus for pipelines according to claim 1, further comprising:
    an elongate chemical dispensing tube, the elongate chemical dispensing tube extending forwardly from the chemical dispensing passage in communication with the chemical chamber to dispense the chemical.

6. The chemical pigging apparatus for pipelines according to claim 5, wherein the elongate chemical dispensing tube is flexible.

7. The chemical pigging apparatus for pipelines according to claim 5, wherein the elongate chemical dispensing tube has a diameter and a forward perforated dispensing tip, the forward perforated dispensing tip having a larger diameter than the diameter of the elongate chemical dispensing tube.

8. A chemical pigging apparatus for pipelines, comprising:
    a forward component, comprising:
        a chemical chamber having a forward end in communication with a chemical dispensing passage and having an open rearward end opposite the forward end;
        a forward seal disposed upon the forward end of the chemical chamber;
        a rearward seal disposed upon the rearward end of the chemical chamber; and
    a rearward component having a rearward component seal thereon,
        wherein the rearward component articulatingly engages the forward component to move the forward component, and the rearward component extends into and pressurizes the chemical chamber of the forward component to move a chemical from the chemical chamber into the chemical dispensing passage to dispense the chemical.

9. The chemical pigging apparatus for pipelines according to claim 8, wherein the rearward component comprises:
    a base;
    a rigid rod extending forwardly from the base, the rigid rod having a forward end; and
    a protrusion disposed upon the forward end of the rigid rod,
        wherein the protrusion extends into the chemical chamber of the forward component to move the chemical from the chemical chamber into the chemical dispensing passage to dispense the chemical.

10. The chemical pigging apparatus for pipelines according to claim 9, further comprising:
    a piston sealingly disposed within the chemical chamber, the piston having a rearward end,
    wherein the protrusion of the rigid rod engages the rearward end of the piston and urges the piston forward within the chemical chamber to pressurize the chemical chamber.

11. The chemical pigging apparatus for pipelines according to claim 10, wherein
    the piston includes a hemispherical socket disposed in the rearward end thereof, and
    the protrusion of the rigid rod having a convex hemispherical configuration,
    wherein the protrusion of the rigid rod articulatingly engages the socket of the piston to move the rearward component relative to the forward component.

12. The chemical pigging apparatus for pipelines according to claim 8, further comprising:
    an elongate chemical dispensing tube, the elongate chemical dispensing tube extending forwardly from the chemical dispensing passage in communication with the chemical chamber to dispense the chemical.

13. The chemical pigging apparatus for pipelines according to claim 12, wherein the elongate chemical dispensing tube is flexible.

14. The chemical pigging apparatus for pipelines according to claim 12, wherein the elongate chemical dispensing tube has a diameter and a forward perforated dispensing tip, the forward perforated dispensing tip having a larger diameter than the diameter of the elongate chemical dispensing tube.

15. A chemical pigging apparatus for pipelines, comprising:
    a forward component, comprising:
        a chemical chamber having a forward end in communication with a chemical dispensing passage and having an open rearward end opposite the forward end; and
        a piston sealingly disposed within the chemical chamber; and
    a rearward component,
        wherein the rearward component engages the piston and urges the piston forward within the chemical chamber, the piston pressurizing the chemical chamber of the forward component by movement of the rearward component to dispense the chemical.

16. The chemical pigging apparatus for pipelines according to claim 15, wherein the rearward component comprises:
   a base;
   a rod extending forwardly from the base, the rod having a forward end; and
   a protrusion disposed upon the forward end of the rod,
   wherein the protrusion extends into the chemical chamber of the forward component and engages the piston.

17. The chemical pigging apparatus for pipelines according to claim 16, further comprising:
   a forward seal disposed upon the forward end of the chemical chamber;
   a rearward seal disposed upon the rearward end of the chemical chamber; and
   a rearward component seal disposed upon the rearward component,
   wherein the protrusion of the rod articulatingly engages the piston and pressurizes the chemical chamber of the forward component to move the piston to dispense the chemical.

18. The chemical pigging apparatus for pipelines according to claim 16, wherein
   the piston includes a socket disposed in a rearward end thereof, and
   the protrusion of the rod includes a corresponding mating configuration to articulatingly engage the socket of the piston.

19. The chemical pigging apparatus for pipelines according to claim 15, further comprising:
   an elongate chemical dispensing tube, the elongate chemical dispensing tube extending forwardly from the chemical dispensing passage in communication with the chemical chamber to dispense the chemical.

20. The chemical pigging apparatus for pipelines according to claim 19, wherein the elongate chemical dispensing tube has a diameter and a forward perforated dispensing tip, the forward perforated dispensing tip having a larger diameter than the diameter of the elongate chemical dispensing tube.

\* \* \* \* \*